(12) United States Patent
Stirling-Gallacher et al.

(10) Patent No.: US 11,102,783 B2
(45) Date of Patent: Aug. 24, 2021

(54) SYSTEM AND METHOD FOR SUPPORTING BEAMFORMED SOUNDING REFERENCE SIGNALS

(71) Applicant: Futurewei Technologies, Inc., Plano, TX (US)

(72) Inventors: Richard Stirling-Gallacher, San Diego, CA (US); Bin Liu, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 16 days.

(21) Appl. No.: 16/029,980

(22) Filed: Jul. 9, 2018

(65) Prior Publication Data

US 2019/0021079 A1    Jan. 17, 2019

Related U.S. Application Data

(60) Provisional application No. 62/532,177, filed on Jul. 13, 2017.

(51) Int. Cl.
*H04W 4/00* (2018.01)
*H04W 72/04* (2009.01)
(Continued)

(52) U.S. Cl.
CPC ........ *H04W 72/046* (2013.01); *H04B 7/0617* (2013.01); *H04B 7/0695* (2013.01);
(Continued)

(58) Field of Classification Search
CPC .. H04W 72/046; H04W 72/042; H04W 88/08
See application file for complete search history.

(56) References Cited

U.S. PATENT DOCUMENTS

2012/0320874 A1    12/2012  Li et al.
2015/0009951 A1*    1/2015  Josiam ................. H04L 5/0051
                                                            370/330
(Continued)

FOREIGN PATENT DOCUMENTS

CN    103765792 A    4/2014
CN    106255209 A    12/2016
(Continued)

OTHER PUBLICATIONS

Huawei (R1-1706938, UL SRS design for beam management, CSI acquisition, May 15-19, 2017), see section 2.3 on 7th page. (Year: 2017).*

(Continued)

*Primary Examiner* — Maharishi V Khirodhar
(74) *Attorney, Agent, or Firm* — Slater Matsil, LLP

(57) ABSTRACT

A method for operating a user equipment (UE) includes receiving, by the UE from a transmit-receive point (TRP), a sounding reference signal (SRS) configuration for a SRS resource, determining, by the UE, at least one transmit beam for transmitting a SRS, wherein the at least one transmit beam is determined in accordance with TRP receive beam information and the SRS configuration, and transmitting, by the UE, the SRS on the SRS resource using the at least one transmit beam in accordance with the SRS configuration.

27 Claims, 9 Drawing Sheets

(51) Int. Cl.
*H04B 7/06* (2006.01)
*H04L 5/00* (2006.01)
*H04B 7/08* (2006.01)
*H04W 88/08* (2009.01)

(52) U.S. Cl.
CPC ........... *H04B 7/088* (2013.01); *H04L 5/0051* (2013.01); *H04L 5/0053* (2013.01); *H04L 5/0096* (2013.01); *H04W 72/042* (2013.01); *H04W 88/08* (2013.01); *H04W 88/085* (2013.01)

(56) References Cited

U.S. PATENT DOCUMENTS

| | | | |
|---|---|---|---|
| 2017/0012692 | A1 | 1/2017 | Kim et al. |
| 2017/0230849 | A1 | 8/2017 | Wei et al. |
| 2017/0317866 | A1* | 11/2017 | Stirling-Gallacher .............. H04B 7/088 |
| 2017/0346545 | A1* | 11/2017 | Islam ............... H04B 7/061 |
| 2018/0234959 | A1* | 8/2018 | Ahn ............... H04W 72/042 |
| 2018/0287860 | A1 | 10/2018 | Xia et al. |
| 2018/0288756 | A1 | 10/2018 | Xia et al. |
| 2019/0222279 | A1* | 7/2019 | Xi ............... H04W 72/00 |
| 2019/0349864 | A1* | 11/2019 | Zhang ............... H04W 52/325 |
| 2020/0092059 | A1* | 3/2020 | Zhu ............... H04W 72/042 |

FOREIGN PATENT DOCUMENTS

| | | |
|---|---|---|
| JP | 2016514406 A | 5/2016 |
| WO | 2014133311 A1 | 9/2014 |
| WO | 2015126130 A1 | 8/2015 |

OTHER PUBLICATIONS

Huawei (R1-1611678, UL SRS design for CSI Acquisition and Beam Management, Nov. 14-18, 2016) option B on the (Year: 2016).*

Xinwei (R1-1609691, Beam management Views and Designs, Oct. 10-14, 2016), Proposal 14 on the 9th page. (Year: 2016).*

Huawei (R1-170,6925, uplink beam management, Hangzhou, China, May 15-19, 2017, 3GPP TSG RAN WG1 Meeting #89). (Year: 2017).*

Huawei, R1-1706938, "UL SRS design for beam management, CSI acquisition Document for:", Hangzhou, China, May 15-19, 2017 (Year: 2017).*

LG (R1-1707605, Hangzhou, China May 15-19, 2017) (Year: 2017).*

MCC Support, "Final Report of 3GPP TSG RAN WG1 #88 v1.0.0," 3GPP TSG RAN WG1 Meeting #88bis, R1-1704172, Spokjane, USA, Apr. 7, 2017, 152 pages.

Huawei, et al., "UL SRS design for CSI acquisition and beam management," 3GPP TSG RAN WG1 Meeting #88bis, R1-1704241, Spokanem USA, Apr. 3-7, 2017, 16 pages.

Huawei, et al., "UL SRS design for beam management, CSI acquisition," 3GPP TSG RAN WG1 Meeting #89, R1-1706938, Hangzhou, China, May 15-19, 2017, 9 pages.

"WF on SRS Tx beam determination," 3GPP TSG RAN1 #89, R1-1709376, Agenda Item 7.1.2.2.1, Hangzhou, China, May 15-19, 2017, 4 pages.

Huawei, et al, "UL SRS design for beam management and CSI acquisition," 3GPP TSG RAN WG1 NR Ad Hoc Meeting, Agenda Item 5.1.2.4.5, R1-1709936, Qingdao, China, Jun. 30, 2017, 8 pages.

Huawei et al., "UL SRS Design for CSI Aquisition and Beam Management," 3GPP TSG RAN WG1 Meeting #87, R1-1611678, Nov. 14-18, 2016, 5 pages, Reno, USA.

Guangdong Oppo Mobile Telecom, "Discussion on the UL Beam Management," 3GPP TSG RAN WG1 NR Ad-Hoc#2, R1-1710143, Jun. 27-30, 2017, 4 pages, Qingdao, P.R. China.

Huawei et al., "UL beam management," 3GPP TSG RAN WG1 Meeting #88b, R1-1704231, Agenda Item 8.1.2.2.1, Spokane, USA, Apr. 3-7, 2017, 7 pages.

* cited by examiner

SYSTEM AND METHOD FOR SUPPORTING BEAMFORMED SOUNDING REFERENCE SIGNALS

This application claims the benefit of U.S. Provisional Application No. 62/532,177, filed on Jul. 13, 2017, entitled "System and Method for Supporting Beamformed Sounding Reference Signals," which application is hereby incorporated herein by reference in its entirety.

TECHNICAL FIELD

The present disclosure relates generally to a system and method for digital communications, and, in particular embodiments, to a system and method for supporting beamformed sounding reference signals.

BACKGROUND

Future wireless communications systems are operating at ever higher carrier frequencies in a quest to find greater bandwidth and less interference. These wireless communications systems may operate at frequencies of 6 GHz and above. In order to fully utilize the greater bandwidth available in the wireless communications systems, transmission-reception points (TRPs) may require more bandwidth and less latency than what is afforded in existing backhaul or fronthaul connections. Furthermore the density of the TRPs is likely to be much higher than current deployments and the cost of laying wireline high capacity backhaul connections to all of these TRPs can be prohibitive. Additionally, in certain situations some TRPs may be temporal in nature or mobile and may not be able to support a wireline connection.

Reference signals are commonly used to assist communications devices to make measurements. As an example, channel state information reference signals (CSI-RSs) are transmitted by TRPs to allow user equipments (UEs) to measure downlink channels, while sounding reference signals (SRSs) are transmitted by UEs to allow TRPs to measure uplink channels.

In communications systems that are link-budget limited (such as communications systems operating above 6 GHz, e.g., millimeter wave (mmWave) communications systems) the reference signals would need to be beamformed (at a transmitting device and a receiving device) to meet performance requirements in an operating environment with high path-loss.

SUMMARY

Example embodiments provide a system and method for supporting beamformed sounding reference signals.

In accordance with an example embodiment, a computer implemented method for operating a user equipment (UE) is provided. The method includes receiving, by the UE from a transmit-receive point (TRP), a sounding reference signal (SRS) configuration for a SRS resource, determining, by the UE, at least one transmit beam for transmitting a SRS, wherein the at least one transmit beam is determined in accordance with TRP receive beam information and the SRS configuration, and transmitting, by the UE, the SRS on the SRS resource using the at least one transmit beam in accordance with the SRS configuration.

Optionally, in any of the preceding embodiments, an embodiment wherein the at least one transmit beam is further determined in accordance with downlink channel measurements made by the UE.

Optionally, in any of the preceding embodiments, an embodiment wherein the TRP receive beam information is received in the SRS configuration.

Optionally, in any of the preceding embodiments, an embodiment further includes determining, by the UE, the TRP receive beam information in accordance with the SRS configuration and previously received TRP receive beam information.

Optionally, in any of the preceding embodiments, an embodiment further includes determining, by the UE, the TRP receive beam information in accordance with a continuation indicator and previously received TRP receive beam information.

Optionally, in any of the preceding embodiments, an embodiment further includes determining, by the UE, the TRP receive beam information in accordance with a persistence indicator and previously received TRP receive beam information.

Optionally, in any of the preceding embodiments, an embodiment wherein the TRP receive beam information comprises at least two message types for each SRS resource.

Optionally, in any of the preceding embodiments, an embodiment wherein a first message type conveys information about a receive beam at the TRP associated with a SRS resource, and a second message type conveys information about whether the receive beam has changed since the first message type.

Optionally, in any of the preceding embodiments, an embodiment wherein the second message type conveys information about whether the receive beam has changed with respect to the first message type.

Optionally, in any of the preceding embodiments, an embodiment wherein the second message type conveys information about a persistence window for the receive beam.

Optionally, in any of the preceding embodiments, an embodiment wherein the TRP receive beam information comprises an uplink reference signal resource indicator previously transmitted by the UE and received using a receive beam associated with the SRS resource as specified in the SRS configuration.

Optionally, in any of the preceding embodiments, an embodiment wherein the TRP receive beam information comprises a downlink reference signal resource indicator previously transmitted by the UE and received with spatial filtering associated with a receive beam associated with the SRS resource as specified in the SRS configuration.

Optionally, in any of the preceding embodiments, an embodiment wherein the TRP receive beam information comprises an uplink data signal resource indicator previously transmitted by the UE and received using a receive beam associated with the SRS resource as specified in the SRS configuration.

In accordance with an example embodiment, a UE is provided. The UE includes a non-transitory memory storage comprising instructions, and one or more processors in communication with the memory storage. The one or more processors execute the instructions to receive, from a TRP, a SRS configuration for a SRS resource, determine at least one transmit beam for transmitting a SRS, wherein the at least one transmit beam is determined in accordance with TRP receive beam information and the SRS configuration, and transmit the SRS on the SRS resource using the at least one transmit beam in accordance with the SRS configuration.

Optionally, in any of the preceding embodiments, an embodiment wherein the one or more processors further execute the instructions to determine the at least one transmit beam in accordance with downlink channel measurements made by the UE.

Optionally, in any of the preceding embodiments, an embodiment wherein the one or more processors further execute the instructions to determine the TRP receive beam information in accordance with the SRS configuration and previously received TRP receive beam information.

Optionally, in any of the preceding embodiments, an embodiment wherein the one or more processors further execute the instructions to determine the TRP receive beam information in accordance with a continuation indicator and previously received TRP receive beam information.

Optionally, in any of the preceding embodiments, an embodiment wherein the one or more processors further execute the instructions to determine the TRP receive beam information in accordance with a persistence indicator and previously received TRP receive beam information.

Optionally, in any of the preceding embodiments, an embodiment wherein the TRP receive beam information comprises an uplink reference signal resource indicator previously transmitted by the UE and received using a receive beam associated with the SRS resource as specified in the SRS configuration.

Optionally, in any of the preceding embodiments, an embodiment wherein the TRP receive beam information comprises a downlink reference signal resource indicator previously transmitted by the UE and received with spatial filtering associated with a receive beam associated with the SRS resource as specified in the SRS configuration.

Optionally, in any of the preceding embodiments, an embodiment wherein the TRP receive beam information comprises an uplink data signal resource indicator previously transmitted by the UE and received using a receive beam associated with the SRS resource as specified in the SRS configuration.

Optionally, in any of the preceding embodiments, an embodiment wherein the one or more processors further execute the instructions to transmit the SRS using the at least one transmit beam in accordance with the SRS configuration.

In accordance with an example embodiment, a non-transitory computer-readable medium storing computer instructions is provided. When executed by one or more processors, the instructions cause the one or more processors to perform the steps of receive from a TRP a SRS configuration for a SRS resource, determine at least one transmit beam for transmitting a SRS, wherein the at least one transmit beam is determined in accordance with TRP receive beam information and the SRS configuration, and transmit the SRS on the SRS resource using the at least one transmit beam in accordance with the SRS configuration.

Optionally, in any of the preceding embodiments, an embodiment wherein the one or more processors further execute the instructions to determine the at least one transmit beam in accordance with downlink channel measurements made by a UE.

Optionally, in any of the preceding embodiments, an embodiment wherein the one or more processors further execute the instructions to determine the TRP receive beam information in accordance with the SRS configuration and previously received TRP receive beam information.

Optionally, in any of the preceding embodiments, an embodiment wherein the one or more processors further execute the instructions to determine the TRP receive beam information in accordance with a continuation indicator and previously received TRP receive beam information.

Optionally, in any of the preceding embodiments, an embodiment wherein the one or more processors further execute the instructions to determine the TRP receive beam information in accordance with a persistence indicator and previously received TRP receive beam information.

Optionally, in any of the preceding embodiments, an embodiment wherein the one or more processors further execute the instructions to transmit the SRS using the at least one transmit beam in accordance with the SRS configuration.

Practice of the foregoing embodiments enables reduced overhead associated with signaling reference signal configuration information. The reduced overhead helps to improve overall communications system performance.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The structure, manufacture and use of the example embodiments are discussed in detail below. It should be appreciated, however, that the present disclosure provides many applicable inventive concepts that can be embodied in a wide variety of specific contexts. The specific embodiments discussed are merely illustrative of specific structures and ways to make and use the embodiments, and do not limit the scope of the disclosure.

Figure 1:
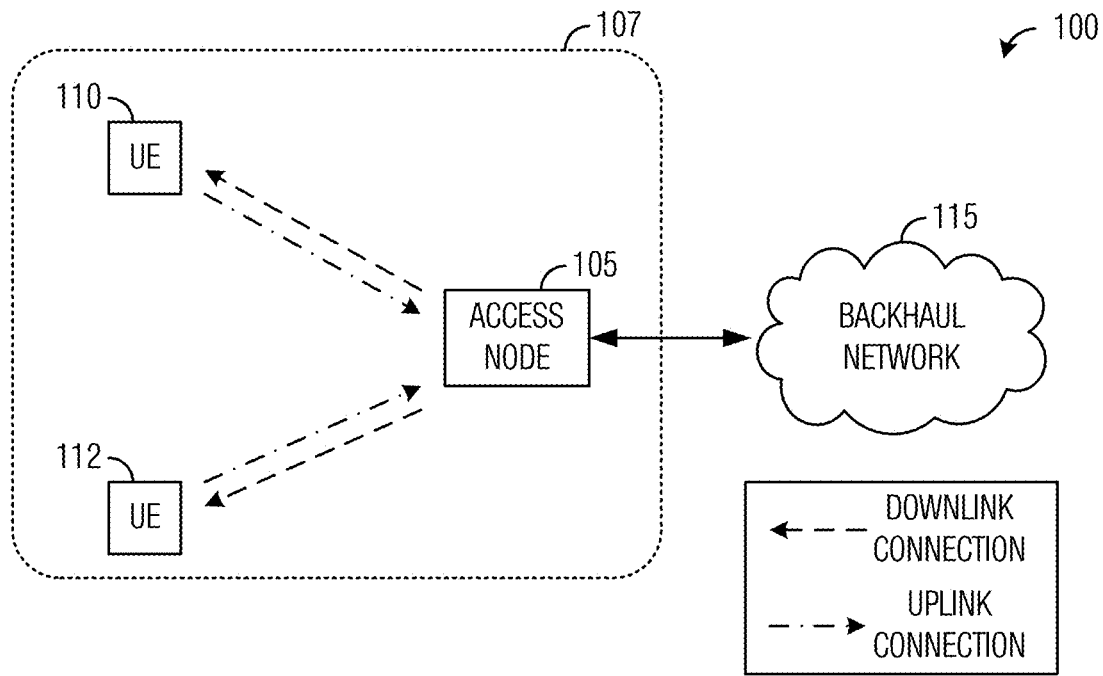
FIG. 1 illustrates an example wireless communications system according to example embodiments described herein.

FIG. 1 illustrates an example wireless communications system 100. Communications system 100 includes an access node 105 with a coverage area 107. Access node 105 serves a plurality of user equipment (UEs), including UE no and UE 112. As shown in FIG. 1, access node 105 establishes downlink (dashed lines) and uplink (dashed dotted lines) connections with the UEs. The downlink connections carry data from access node 105 to the UEs and the uplink connections carry data from the UEs to access node 105. Data carried over the downlink or uplink connections may include data communicated between the UEs and services (not shown) by way of a backhaul network 115. Wireless access may be provided in accordance with one or more wireless communications protocols, e.g., the Third Generation Partnership Project (3GPP) Long Term Evolution (LTE), LTE Advanced (LTE-A), Fifth Generation (5G) New Radio (NR), high speed packet access (HSPA), IEEE 802.11, and so on. While it is understood that communications systems may employ multiple access nodes capable of communicating with a number of UEs, only one access node, and two UEs are illustrated for simplicity.

Access nodes may refer to evolved NodeBs (eNBs), base stations, next generation (NG) NodeBs (gNBs), NodeBs, master eNBs (MeNBs), secondary eNBs (SeNBs), master gNBs (MgNBs), secondary gNBs (SgNBs), remote radio heads, access points, while UEs may refer to mobiles, mobile stations, terminals, subscribers, users, and the like. A transmission point (TP) may be considered to be a device sending a transmission, and a reception point (RP) may be considered to be a device receiving the transmission. A single device may be both a transmission point and a reception point for different transmissions; such a device is referred to as a transmit-receive point (TRP). Access nodes may be TRPs. In some situations, UEs may also be TRPs.

In 3GPP LTE communications systems, UEs transmit sounding reference signals (SRSs) to the TRPs so that the TRPs may estimate the complex channel response of the uplink channels, and then by utilizing the channel reciprocity relationship, an estimate of the complex channel response of the downlink channel can be determined. The estimated channel responses may be used to determine communications beams at the TRP with which to transmit downlink transmissions to the UEs or to receive uplink transmissions from the UEs. As used herein, the term communications beam refers to a set of beamforming weights (e.g., amplitude or phase shifts for antenna elements of an antenna array) that are used for directional signal or reception.

Unlike in 3GPP LTE communications systems, beamforming in millimeter wave (mmWave) communications systems may generally be performed by both the TRPs and the UEs in order to achieve commercially acceptable levels of throughput and range over the higher carrier frequencies. Accordingly, SRS transmission schemes for mmWave communications systems may need to identify communications beams to be used by both the UEs and the TRPs to reduce SRS sounding overhead.

A beam may be a pre-defined set of beamforming weights in the context of codebook-based precoding or a dynamically defined set of beamforming weights in the context of non-codebook based precoding (e.g., Eigen-based beamforming (EBB)). It should be appreciated that a UE may rely on codebook-based precoding to transmit uplink signals and receive downlink signals, while a TRP may rely on non-codebook based precoding to form certain radiation patterns to transmit downlink signals or receive uplink signals.

Simply sounding in every possible transmit-receive communications beam combination would result in too much SRS sounding overhead, negatively impacting communications performance and efficiency. According to the simple SRS sounding technique, a UE performs SRS transmissions according to different transmit beam directions from a set of transmit beam directions available to the UE, and the TRP receives the beamformed SRS transmissions from the UE according to different receive beam directions from a set of receive beam directions available to the TRP. Transmit beams are communications beams used by communications devices, such as UEs or TRPs, to beamform transmissions and direct the transmissions to directions corresponding to the communications beams. Receive beams are similar, but are used by communications devices to direct a receiver in directions corresponding to the communications beams. Transmit beams and receive beams are used to increase signal gain in respective beam directions. The TRP estimates the complex channel responses for the uplink channels based on the received SRS transmissions and determines the estimates for the corresponding downlink channels. The estimates may be used to determine which communications beams the TRP uses to transmit downlink signals as well as which beam directions the UE uses to receive the downlink signals.

It is noted that the channel in mmWave communications systems are spatially sparse and that only a few spatial directions are significant. Due to the high path loss, mmWave communications beams are easily blocked and reflected signals are subject to high reflection losses (on the order of 10-25 dB) as well as extra path loss to reach the receiver. Therefore, in most situations only communications beams that are directly (or substantially directly) oriented towards a device have adequately high signal to noise ratios (SNRs) to support good throughput. However, situations exist where the communications beams that are directly oriented towards a device are blocked. In such situations, beams that are not directly oriented, but are substantially directly oriented towards the device may have the best SNRs. The communications beams with adequately high SNRs are referred to as significant communications beams.

Figure 2:
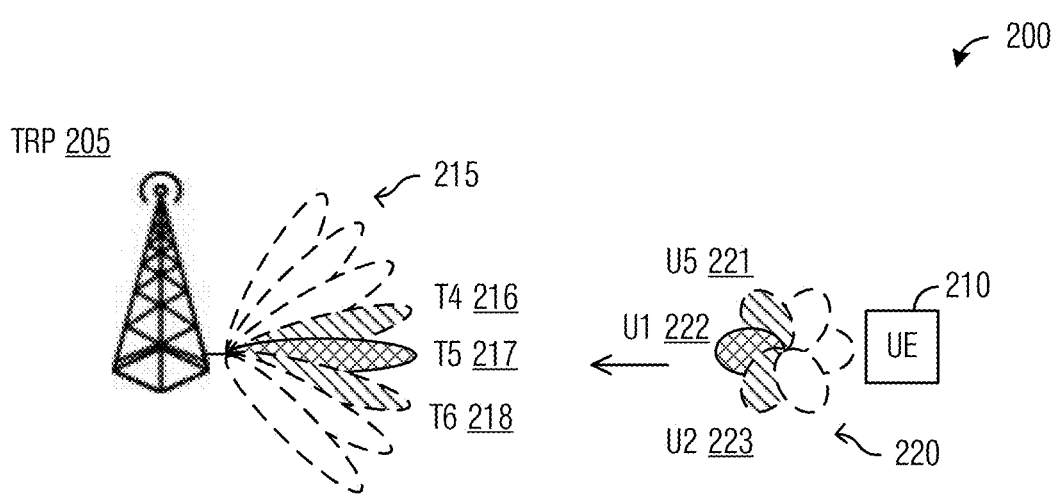
FIG. 2 illustrates an example communications system highlighting significant communications beams according to example embodiments described herein.

FIG. 2 illustrates an example communications system 200 highlighting significant communications beams. Communications system 200 includes a TRP 205 serving a UE 210. TRP 205 may perform beamformed communications using a set of communications beams 215 (a portion of the set of communications beams 215 is shown in FIG. 2). Similarly, UE 210 communicates using a set of communications beams 220. Although there are many available communications beams in set of communications beams 215 and set of communications beams 220, due to the high path loss nature of mmWave channels, only a subset of the available communications beams are significant. As an example, only TRP communications beam #T4 216, TRP communications beam #T5 217, and TRP communications beam #T6 218, which are oriented directly or substantially directly towards UE 210 are significant receive beams. While, only UE communications beam #U1 222, UE communications beam #U2 223, and UE communications beam #U5 221, which are oriented directly or substantially directly towards TRP 205 are significant transmit beams. Each combination of transmit communications beam to receive communications beam is referred to as a transmit beam-receive beam combination (TRBC).

It is further noted that even among the significant communications beams, only a subset of the possible TRBCs of the significant communications beams are significant. As an illustrative example, the combination of UE communications beam #U1 222 and TRP communications beam #T5 217 are significant, as is the combination of UE communications beam #U2 223 and TRP communications beam #T6 218. However, the combination of UE communications beam #U5 221 and TRP communications beam #T6 218 may not be significant due to their mismatched orientations. Similarly, the combination of UE communications beam #U2 223 and TRP communications beam #T4 216 may not be significant.

In order to provide a full estimate of downlink channels for each TRP to UE link, uplink SRS are used in a time division duplexed (TDD) communications system to enable the TRP to estimate the downlink channel from the uplink channel using the channel reciprocity assumption. The TRP may then choose to perform non-codebook based single user (SU) or multi-user (MU) multiple input multiple output (MIMO) beamforming for each UE. The uplink SRSs may also be used for uplink channel estimations to support uplink MIMO.

Due to the use of beamformed SRS by the UEs, it may be very time (and resource) consuming for each UE to transmit beamformed signals in each spatial direction and for the TRP to receive in every spatial direction. In co-assigned U.S. patent application Ser. No. 15/139,987, entitled "Sounding Reference Signal (SRS) Design for Cellular Time Division Duplex (TDD) mmWave Systems", filed Apr. 27, 2016, which is hereby incorporated herein by reference, techniques are provided for reducing SRS sounding overhead by allowing UEs to determine the most relevant uplink beam directions based on downlink measurements.

Figure 3:
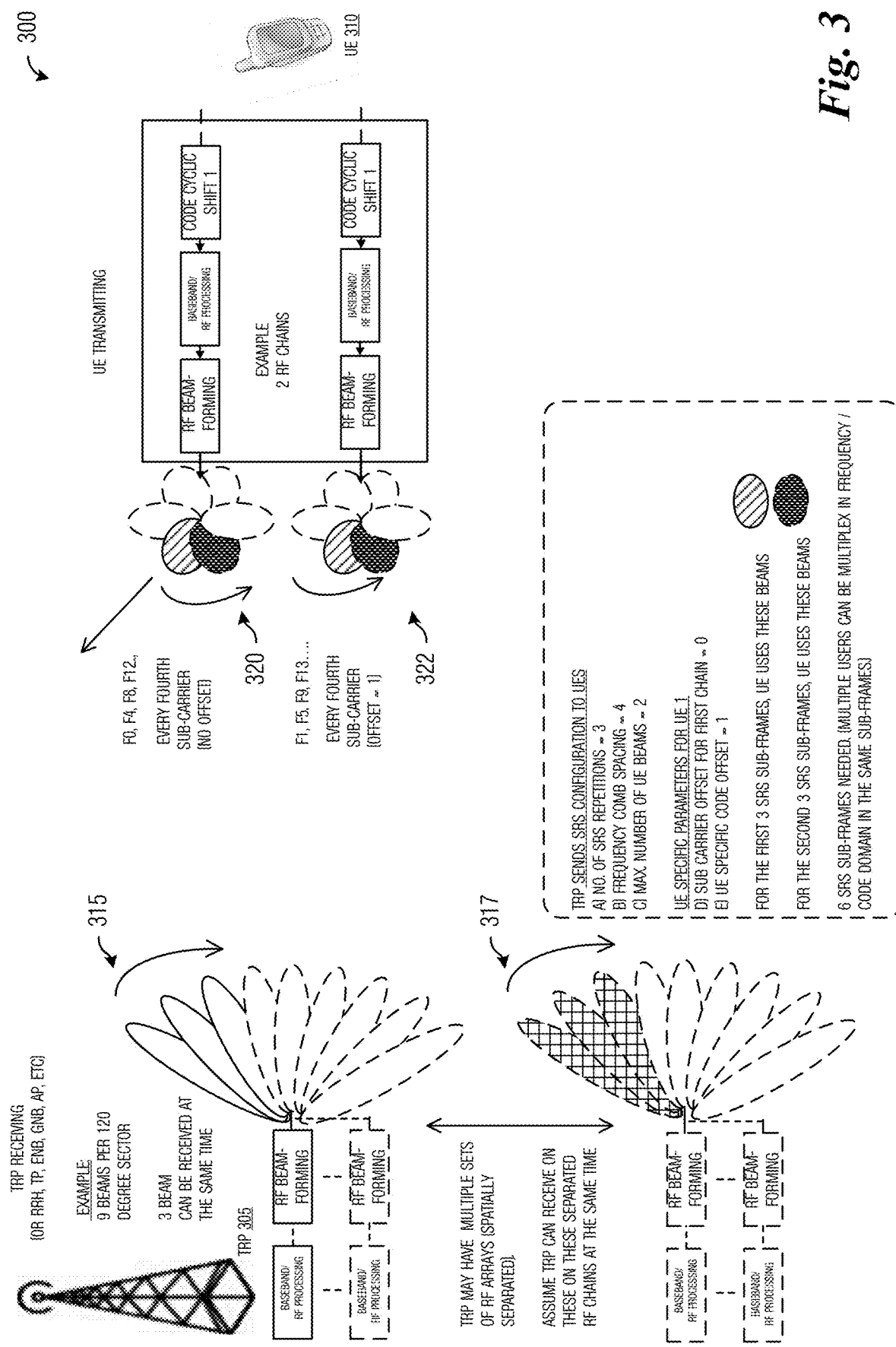
FIG. 3 illustrates an example communications system, providing a summary of a technique disclosed in co-assigned U.S. patent application Ser. No. 15/139,987 according to example embodiments described herein.

FIG. 3 illustrates an example communications system 300, providing a summary of a technique disclosed in co-assigned U.S. patent application Ser. No. 15/139,987. Communications system 300 includes a TRP 305 serving a UE 310. TRP 305 includes a plurality of radio frequency (RF) chains, with each RF chain communicating using a set of communications beams. As an example, a first TRP RF chain communicates using set of first communications beams 315 and a second TRP RF chain communicates using a set of second communications beams 317. Similarly, UE 310 includes a plurality of RF chains, with each RF chain communicating using a set of communications beams. As an example, a first UE RF chain communicates using a set of first communications beams 320 and a second UE RF chain communicates using a set of second communications beams 322. As disclosed in co-assigned U.S. patent application Ser. No. 15/139,987, UE 310 determines which beam directions to choose for transmitting the beamformed SRS based on downlink measurements and the SRS resources allocated to UE 310. Reducing the TRBCs reduces the overhead associated with the SRS sounding.

Also presented in co-assigned U.S. patent application Ser. No. 15/139,987 is a technique involving the TRP informing the UE about which receive beam that the TRP will be using to listen for each SRS sounding opportunity. The receive beam information is a SRS configuration parameter, and the TRP informing the UE regarding the receive beams means that the TRP does not need to use all of its available receive beams for each SRS sounding opportunity. As an example, the TRP sends a list of one or more beam indices corresponding to the receive beams that the TRP is using to listen during a particular SRS sounding opportunity. The list of one or more beam indices, along with other SRS configuration parameters, including an identifier of one or more SRS resources, time domain behavior, number of ports, number of orthogonal frequency division multiplexed (OFDM) symbols, SRS bandwidth and frequency hopping bandwidth, and so on, or information thereof, is sent to the UE in the form of control information in a media access control (MAC) control element (CE) message or radio resource control (RRC) message, or a combination of both MAC CE and RRC messages. The control information may be further sent in a downlink control information (DCI) message.

In an embodiment, the receive beam information is signaled implicitly. As an example, the type of a message is used to implicitly signal the receive beam information. A first message type of a message transmitted by the TRP may be used to convey information about a receive beam used by the TRP to receive a SRS transmission, while a second message type of the message may be used to convey information that the receive beam has changed. For example, four message types may be available and there is a one-to-one correspondence between the message type and one of four receive beams used by the TRP. After information about the receive beam has been conveyed to the UE, the message type may be used to convey information about changes to the receive beam. As another example, the second message type of the message may be used to convey information that the receive beam used by the TRP has changed with respect to the first message type. As yet another example, the second message type of the message may be used to convey information about the presence of a persistence window for the receive beam used by the TRP. The message type may be used in a manner similar to a persistence indicator described below.

Figure 4A:
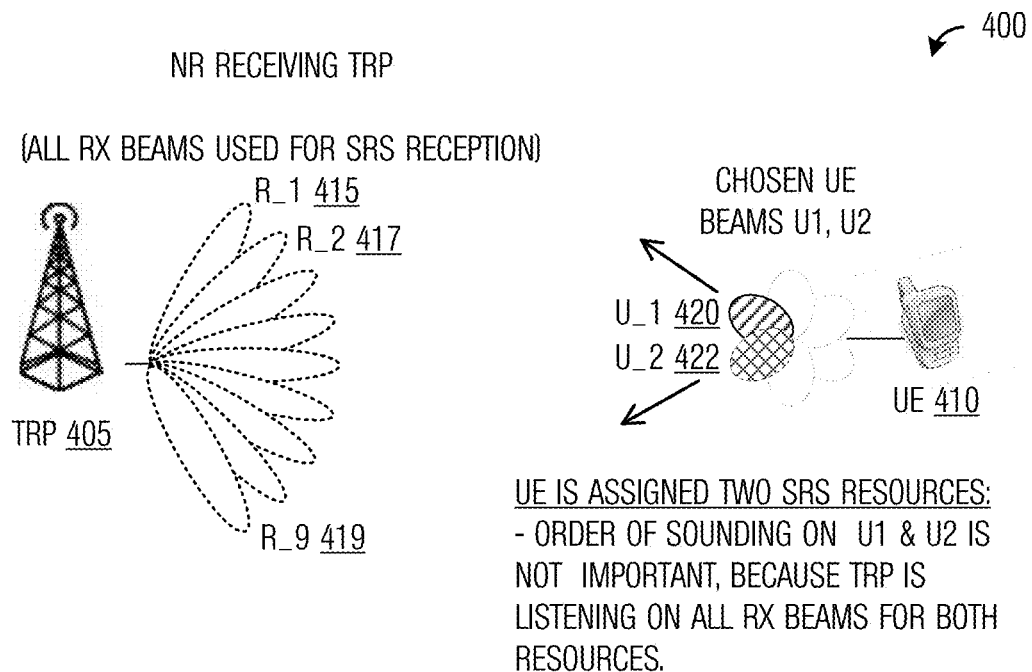
FIG. 4A illustrates an example communications system highlighting a first scenario where a TRP uses all available receive beams for SRS reception according to example embodiments described herein.

FIG. 4A illustrates an example communications system 400 highlighting a first scenario where a TRP uses all available receive beams for SRS reception. Communications system 400 includes a TRP 405 serving a UE 410. As shown in FIG. 4A, TRP 405 uses all available receive beams, such as receive beams R_1 415, R_2 417, and R_9 419, for SRS reception. UE 410 has been configured by TRP 405, for example, to transmit SRS on two SRS resources. For a first SRS resource, UE 410 uses transmit beam U_1 420 to transmit the SRS and for a second SRS resource, UE 410 uses transmit beam U_2 422 to transmit the SRS. It is noted that the order of sounding on U_1 420 and U_2 422 is not important because TRP 405 is listening on all receive beams for both SRS resources.

Figure 4B:
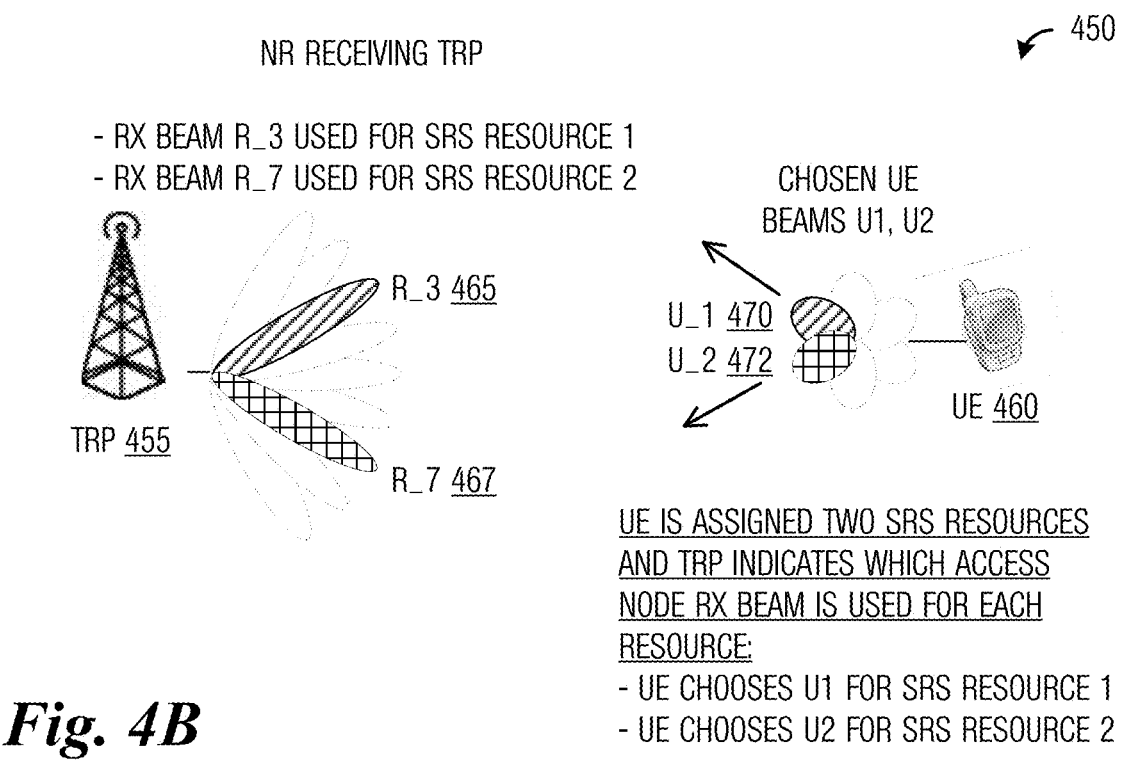
FIG. 4B illustrates an example communications system highlighting a second scenario where a TRP uses a subset of available receive beams for SRS reception according to example embodiments described herein.

FIG. 4B illustrates an example communications system 450 highlighting a second scenario where a TRP uses a subset of available receive beams for SRS reception. Communications system 450 includes a TRP 455 serving a UE 460. As shown in FIG. 4B, TRP 455 uses receive beam R_3 465 for a first SRS resource and receive beam R_7 467 for a second SRS resource. UE 460 has been configured by TRP 455, for example, to transmit SRS on two SRS resources. For a first SRS resource, UE 460 uses transmit beam U_1 470 to transmit the SRS and for a second SRS resource, UE 460 uses transmit beam U_2 472 to transmit the SRS.

Because TRP 455 is not using all receive beams to listen for the SRS resources, an ordering of the sounding on U_1 470 and U_2 472 may be important. If the ordering is incorrect, TRP 455 may be listening for an SRS resource with an suboptimal receive beam. Therefore, UE 460 may need to know which receive beam is used by TRP 455 for each SRS resource and select a transmit beam accordingly. It is noted that different SRS resources may be used for different beam directions from the same UE port or for different UE ports. Although it is shown that TRP 455 is using a single receive beam at any given time to listen to SRS resources, a capable TRP may listen to SRS resources on a plurality of receive beams at any given time.

3GPP TSG-RAN WG1 #89 document R1-1709376, entitled "WF on SRS TX Beam Determination", China, May 2017, which is hereby incorporated herein by reference, discloses that there are two supported alternatives for SRS transmit beamforming for CSI acquisition and beam management. In a first alternative, the UE applies TRP-transparent transmit beamforming to the SRS (e.g., the UE determines the transmit beam for each SRS port or resource). In a second alternative, the TRP provides information (in the form of one or more bits of information, for example) to the UE.

According to an example embodiment, a TRP conveys information about a receive beam or receive beams used for each assigned SRS resource. The TRP may send the information about the receive beam(s) with the SRS configuration for each SRS resource. As an illustrative example, the TRP may convey information about a downlink reference signal resource that has used the same spatial filtering as the direction of the receive beam(s). An example of a technique where part of the SRS configuration related to the TRP receive beam used by the TRP is conveyed to the UE by the TRP is presented in 3GPP TSG-RAN WG 1 Ad Hoc Meeting document R1-1709936, entitled "UL SRS Design for Beam Management and CSI Acquisition", June 2017, which is hereby incorporated herein by reference.

The UE, receiving the information about receive beam(s) used for each assigned SRS resource, may be able to determine an associated transmit beam(s) (or transmit beam direction(s)) for each assigned SRS resource from measurements of the downlink reference signal resources as conveyed.

The overhead needed for conveyance of the information about the receive beam(s) may be high in the following cases:
- When the TRP receives on i) multiple receive beams per SRS resource, ii) groups of receive beams per SRS resource, or iii) all receive beams per SRS resource, the overhead associated with conveying the information for the downlink reference signal resources may be high.
- When the TRP configures multiple SRS resources for one UE and chooses to use the same set of receive beams for each assigned SRS resource, the repeated signaling of the same set of receive beams may unnecessarily consume resources.

According to an example embodiment, receive beam information application rules are used to provide a basis for determining receive beam information. The receive beam information application rules allows a UE to determine receive beam information from current receive beam information, historical receive beam information, in an absence of receive beam information, or a combination thereof, so the receive beam information is always available to the UE to determine associated transmit beam(s) (or transmit beam direction(s)) for each assigned SRS resource.

Example receive beam information application rules include:
a) If NO receive beam information is signaled to or received by the UE (via SRS configuration or otherwise), it is implied to the UE that the TRP is listening with all receive beams on each SRS resource.
b) If receive beam information (via downlink reference signal resource or otherwise) is signaled to or received by the UE in an initial SRS configuration for an initial set of SRS resources but receive beam information for subsequent set(s) of SRS resources (in time or frequency) is not received in a subsequent SRS configuration, then there are two possible ways to implicitly convey information (or rules that do not require signaling):
- The TRP is using the same receive beams for the subsequent set(s) of SRS resources as used for the initial set of SRS resources. An alternative exists where the TRP is using receive beams that are spatially quasi co-located (QCL) with the receive beams used for the initial set of SRS resources. Spatial QCL beams are discussed in detail in co-assigned U.S. Provisional Patent Application No. 62/521,110, entitled "System and Method for Communications Beam Recovery", filed Jun. 16, 2017, which is hereby incorporated herein by reference.
- The TRP is using all receive beams for each SRS resource in the subsequent set(s) of SRS resources.

Alternative example receive beam application rules include:
a') If NO receive beam information is signaled to or received by the UE (via SRS configuration or otherwise), it is implied to the UE that the TRP is listening with all receive beams on each SRS resource.
b') If receive beam information (via downlink reference signal resource or otherwise) is signaled to or received by the UE in an initial SRS configuration for an initial set of SRS resources but receive beam information for subsequent set(s) of SRS resources (in time or frequency) is not received in a subsequent SRS configuration, then there are two possible ways to implicitly convey information (or rules that do not require signaling):
- The TRP is using the same receive beams for the subsequent set(s) of SRS resources as used for the initial set of SRS resources. An alternative exists where the TRP is using receive beams that are spatially quasi co-located (QCL) with the receive beams used for the initial set of SRS resources.
- The TRP is using all receive beams for each SRS resource in the subsequent set(s) of SRS resources.

Where the receive beam information includes a multi-bit continuation indicator (e.g., 2 bits or more, although other values are possible) that conveys to the UE if the receive beams of the TRP are the same (as previously conveyed), all receive beams are used, or that a change relative to a previous resource has occurred.

An example of the multi-bit continuation indicator includes:
- First value (e.g., "00") conveys that the TRP is using the same receive beams as previously conveyed. Alternatively, the TRP is using receive beams that are spatially QCL with the receive beams previously conveyed.
- Second value (e.g., "01") conveys that the TRP is using receive beams corresponding to an increment of the downlink reference signal resources. Additional bits may be used to convey the amount of the increment, otherwise the increment is one (for example). As an example, the amount of the increment may be specified (such as a binary '10' to convey that the amount of the increment is two) or an index to the amount of the increment may be specified (such as a binary '10' to convey that the amount of the increment is equal to a value corresponding to the third index).

Third value (e.g., "10") conveys that the TRP is using receive beams corresponding to a decrement of the downlink reference signal resources. Additional bits may be used to convey the amount of the decrement, otherwise the decrement is one (for example). As an example, the amount of the decrement may be specified (such as a binary '10' to convey that the amount of the decrement is two) or an index to the amount of the decrement may be specified (such as a binary '10' to convey that the amount of the decrement is equal to a value corresponding to the third index).

Fourth value (e.g., "11") conveys that the TRP is using all receive beams. Although a 2-bit continuation indicator is shown, other bit lengths are possible.

Figure 5:
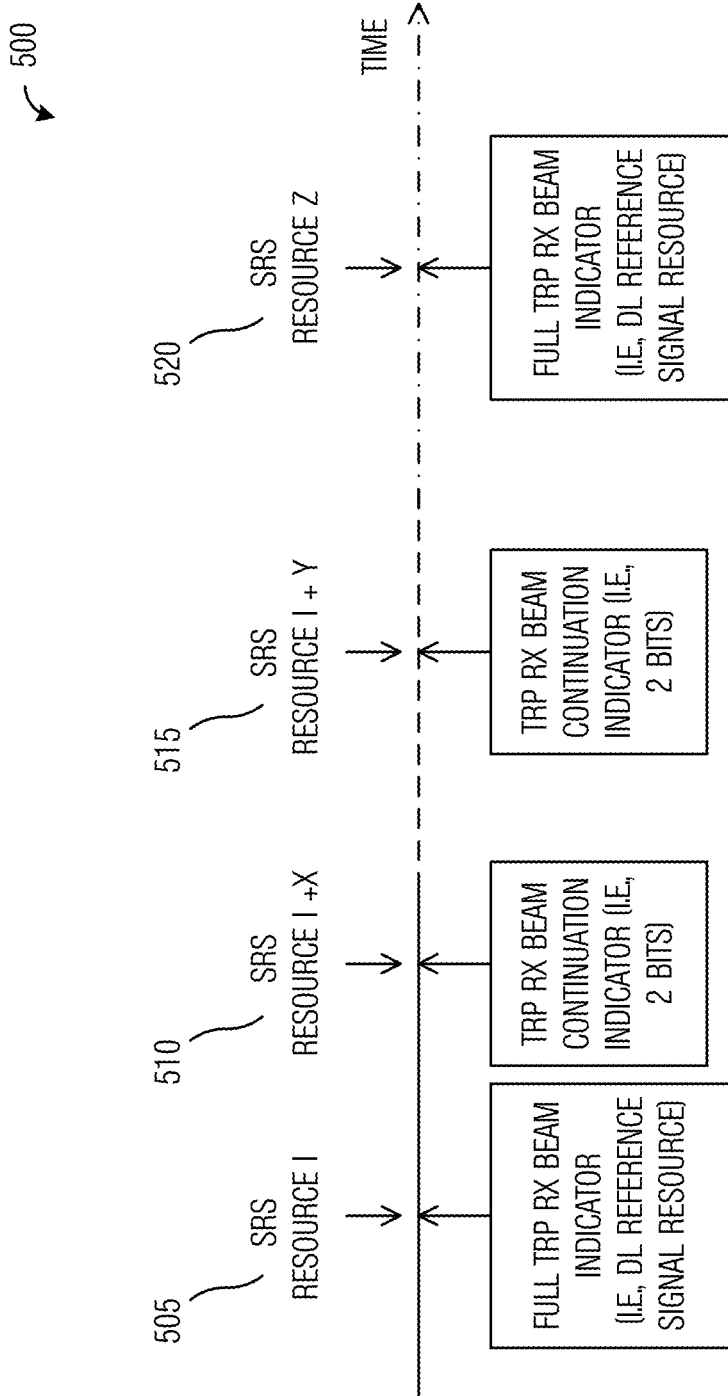
FIG. 5 illustrates a diagram highlighting the use of the continuation indicator for signaling receive beam information according to example embodiments described herein.

FIG. 5 illustrates a diagram 500 highlighting the use of the continuation indicator for signaling receive beam information. As shown in FIG. 5, at a first time, for SRS resource I 505, the TRP conveys receive beam information using downlink reference signal resources, i.e., the TRP is signaling full receive beam information in the SRS configuration. At a subsequent time, for SRS resource I+X 510, instead of signaling full receive beam information as for SRS resource I 505, the TRP signals a first continuation indicator in the SRS configuration. Similarly, at another time, for SRS resource I+Y 515, the TRP signals another continuation indicator in the SRS configuration. Hence, at these times, the TRP is able to reduce signaling overhead by signaling only the continuation indicators. At yet another time, for SRS resource Z 520, the TRP conveys receive beam information using downlink reference signal resources, i.e., the TRP is signaling full receive beam information in the SRS configuration.

Additional alternative example receive beam application rules include:

a") If NO receive beam information is signaled to or received by the UE (via SRS configuration or otherwise), it is implied to the UE that the TRP is listening with all receive beams on each SRS resource.

b") If receive beam information (via downlink reference signal resource or otherwise) is signaled to or received by the UE in an initial SRS configuration for an initial set of SRS resources but receive beam information for subsequent set(s) of SRS resources (in time or frequency) is not received in a subsequent SRS configuration, then there are two possible ways to implicitly convey information (or rules that do not require signaling):

The TRP is using the same receive beams for the subsequent set(s) of SRS resources as used for the initial set of SRS resources. An alternative exists where the TRP is using receive beams that are spatially quasi co-located (QCL) with the receive beams used for the initial set of SRS resources.

The TRP is using all receive beams for each SRS resource in the subsequent set(s) of SRS resources.

Where the receive beam information, as conveyed in the SRS resource, is semi-persistent in nature. In other words, the receive beam information is valid for a time period, as well as a number of resources, a number of SRS resources, until a persistence indicator is received, and so on. The persistence indicator may be a one or more bit long bit string, with a first value conveying that the receive beam information, as well as the number of resources and the number of SRS resources are valid and a second value conveying that the receive beam information, as well as the number of resources and the number of SRS resources are no longer valid, for example. The time period or the number of resources may be specified by a technical standard, an operator of the communications system, agreed upon by the TRP and the UE, or indicated by the TRP. The time period or the number of resources may be conveyed by the persistence indicator. The persistence indicator may be specified by a technical standard, an operator of the communications system, agreed upon by the TRP and the UE, or conveyed by the TRP.

Figure 6:
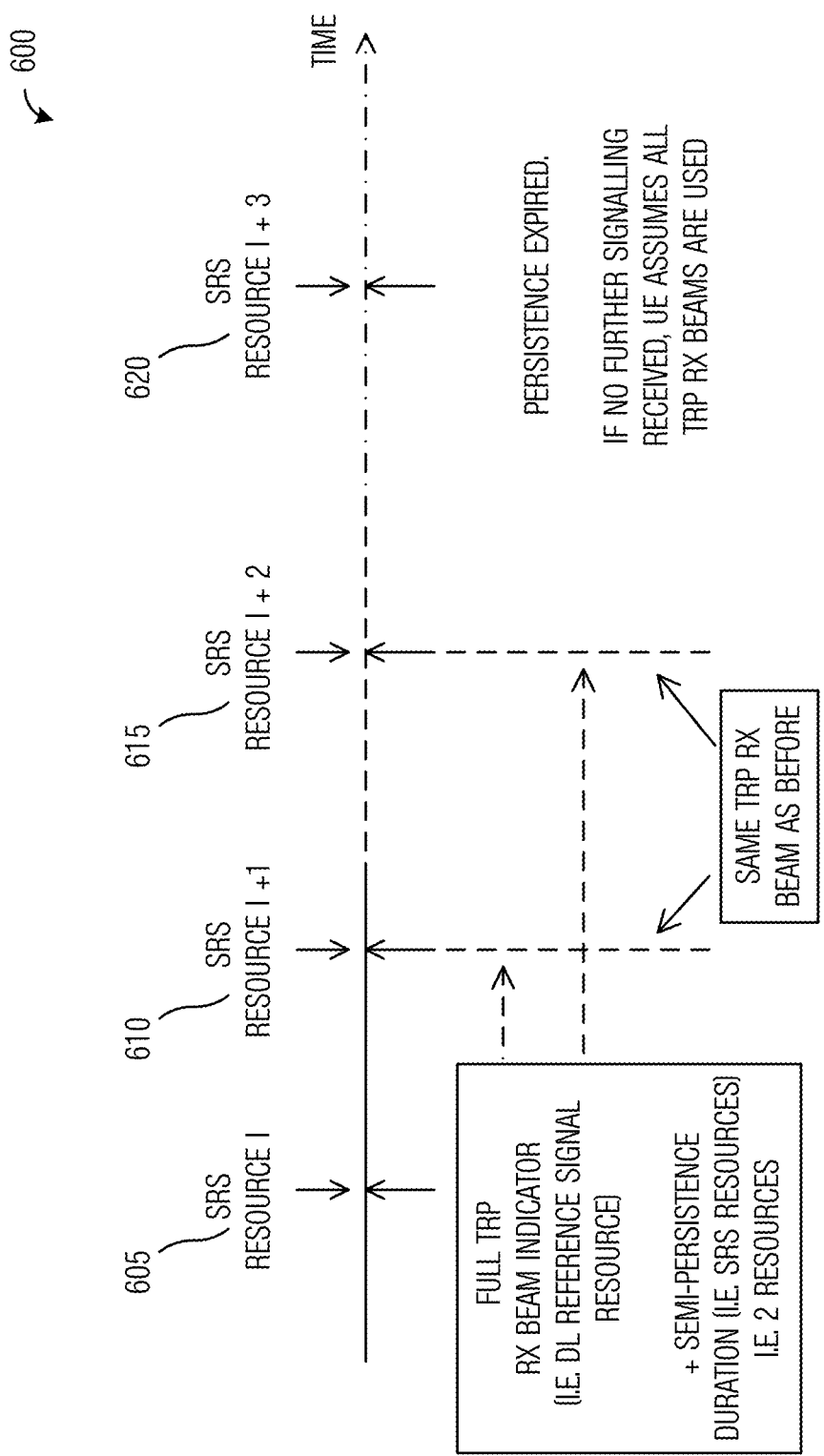
FIG. 6 illustrates a diagram highlighting the use of semi-persistent receive beam information according to example embodiments described herein.

FIG. 6 illustrates a diagram 600 highlighting the use of semi-persistent receive beam information. As shown in FIG. 6, at a first time, for SRS resource I 605, TRP conveys receive beam information using downlink reference signal resources, i.e., the TRP is signaling full receive beam information in the SRS configuration. As shown in diagram 600, the receive beam information is valid for three SRS resources. Therefore, at a second time (for SRS resource I+1 610) and a third time (for SRS resource I+2 615), the TRP does not have to signal receive beam information of any form. At a fourth time, for SRS resource I+3 620, the TRP signals receive beam information because the receive beam information signaled for SRS resource I 605 is no longer valid. As shown in FIG. 6, the TRP signals full receive beam information. However, the TRP may also signal a continuation indicator, as discussed previously.

Although the discussion focuses on receive beam information being valid for a number of SRS resources, the receive beam information may also be valid for a specified time period, until a persistence indicator is received, and so on. Therefore, the discussion on validity based upon a number SRS resources should not be construed as being limiting to either the scope or the spirit of the example embodiments.

According to an example embodiment, a group of receive beams of a TRP are mapped to the same spatial directions as the signaled downlink reference signal resource to reduce the overhead for signaling a group of receive beams used to listen for a SRS resource. In other words, when a group of receive beams is used to listen for a SRS resource, the group of receive beams may be conveyed using a single downlink reference signal resource. However, if the group of receive beams is different from the direction conveyed by the single downlink reference signal resource, other beam group indicators may be used. They include:

A group of receive beams that were used in a previous uplink reference only transmission (e.g., a previous SRS) may be signaled to the UE as an uplink reference resource indicator. The uplink reference resource indicator may be a one or more bit long bit string, for example.

A group of receive beams that were used to receive a previous uplink data transmission may be signaled to the UE as uplink demodulating reference signal (DMRS) indicators. The DMRS indicators may be a one or more bit long bit string, for example. Because there may be one uplink DMRS resource per beam, there may be multiple indicators for each group of receive beams.

A group of receive beams that have the same spatial filtering as in a previous downlink data transmission may be signaled to the UE, e.g., the signaling may be signaled as downlink DMRS indicators. Because there may be one downlink DMRS resource per beam, there may be multiple indicators for each group of receive beams.

Figures 7, 8A:
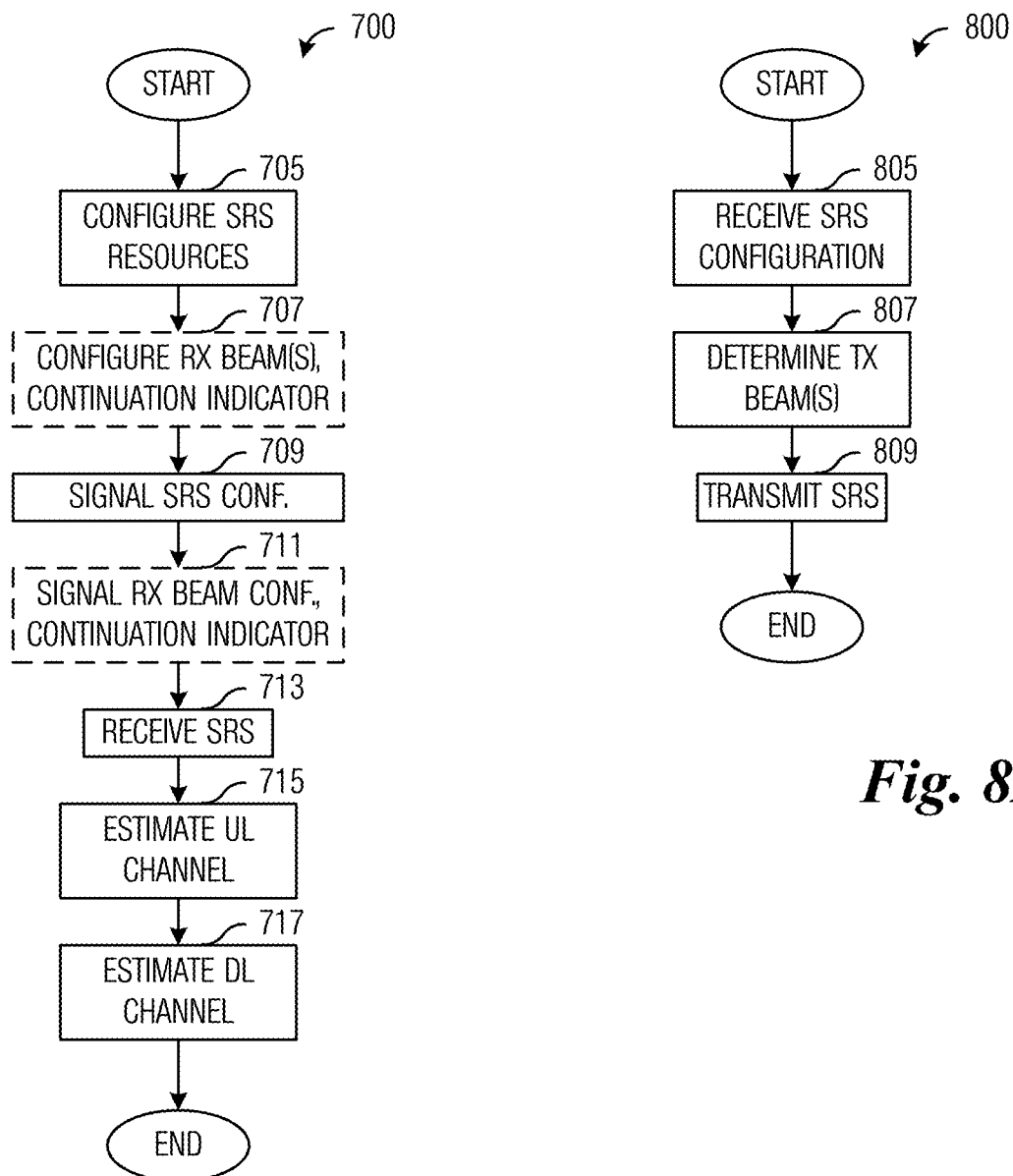
FIG. 7 illustrates a flow diagram of example operations occurring in a TRP signaling receive beam information to UEs to assist the TRP in estimating uplink and downlink channels between the TRP and the UE according to example embodiments described herein.
FIG. 8A illustrates a flow diagram of example operations occurring in a UE signaling SRSs according to example embodiments described herein.

FIG. 7 illustrates a flow diagram of example operations 700 occurring in a TRP signaling receive beam information to UEs to assist the TRP in estimating a downlink channel between the TRP and the UE. Operations 700 may be indicative of operations occurring in a TRP as the TRP signals receive beam information to UEs to assist the TRP in estimating a downlink channel between the TRP and the UE.

Operations 700 begin with the TRP configuring SRS resources for UEs (block 705). The TRP optionally configures receive beams for each of the SRS resources or continuation indicators (block 707). The TRP signals the SRS configuration to the UEs (block 709). The TRP optionally signals the TRP receive beam configuration or the continuation indicators (block 711). The TRP receives the SRS on the SRS resources using the configured receive beams (block 713). The TRP estimates the uplink channels between the UEs and the TRP in accordance with the received SRSs (block 715). The TRP estimates the downlink channels between the TRP and the UEs in accordance with the estimates of the uplink channels (block 717). As an example, the TRP uses channel reciprocity to estimate the downlink channels from the estimates of the uplink channels.

FIG. 8A illustrates a flow diagram of example operations 800 occurring in a UE signaling SRSs. Operations 800 may be indicative of operations occurring in a UE as the UE signals SRSs. Operations 800 may present a high-level view of operations occurring at the UE as the UE signals SRSs.

Operations 800 begin with the UE receiving a SRS configuration (block 805). The UE determines a transmit beam(s) for transmitting SRSs (block 807). The UE may determine the transmit beam(s) from downlink measurements made by the UE, TRP receive beam information received in the SRS configuration, beam information application rules, or a combination thereof. Alternatively, the UE may determine the transmit beam(s) from downlink measurements made by the UE, an absence of TRP receive beam information in the SRS configuration. The UE transmits the SRSs in SRS resource(s) using the transmit beam(s) (block 809).

Figure 8B:
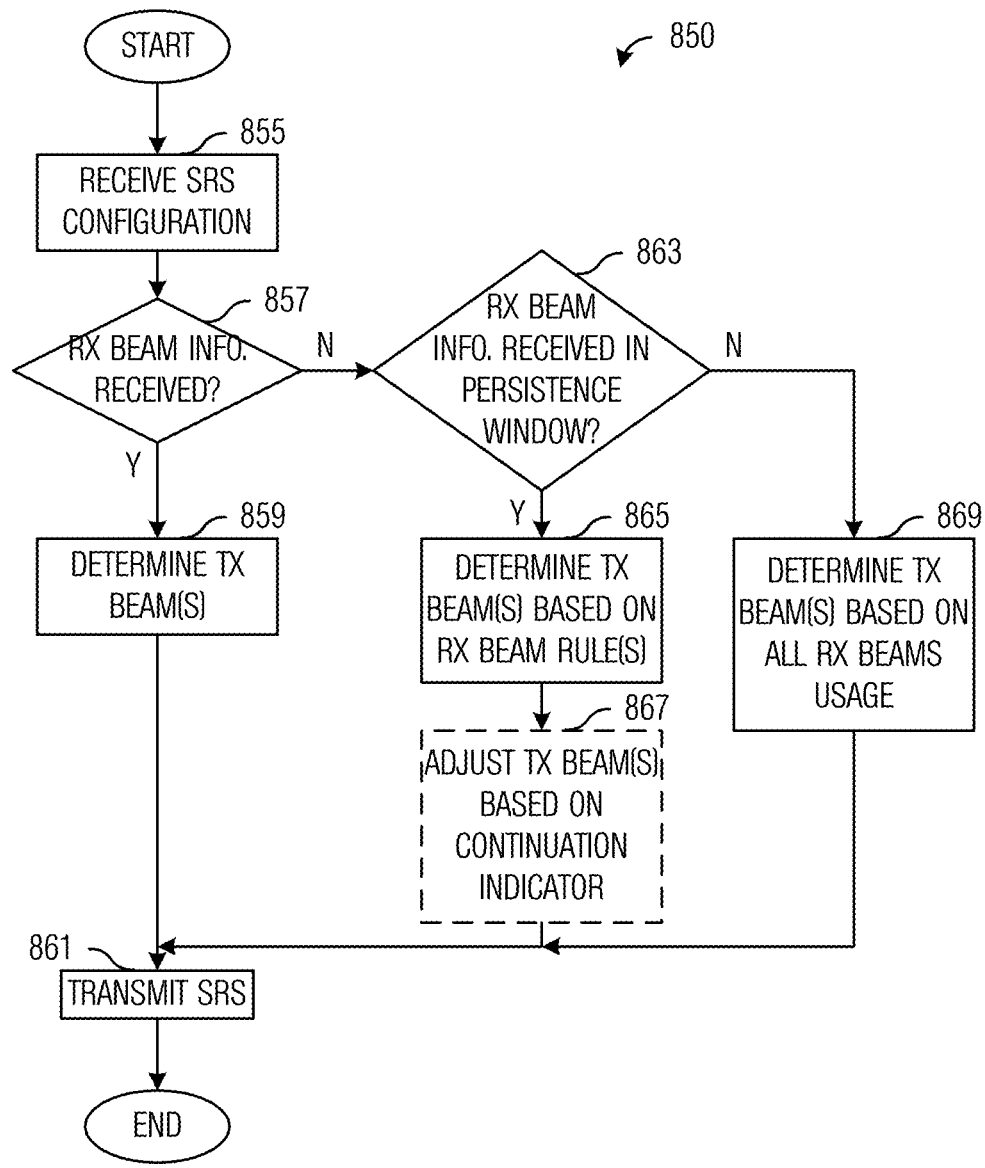
FIG. 8B illustrates a flow diagram of example operations occurring in a UE signaling SRSs, highlighting an application of beam information application rules according to example embodiments described herein.

FIG. 8B illustrates a flow diagram of example operations 850 occurring in a UE signaling SRSs, highlighting an application of beam information application rules presented herein. Operations 850 may be indicative of operations occurring in a UE as the UE signals SRSs. Operations 850 may present a detailed level view of operations occurring at the UE as the UE signals SRSs.

Operations 850 begin with the UE receiving a SRS configuration (block 855). The UE performs a check to determine if TRP receive beam information was received with the SRS configuration (block 857). If the TRP receive beam information was received, the UE determines its transmit beams in accordance with the TRP receive beam information (block 859) and signals the SRS in accordance with the SRS configuration using the transmit beams (block 861).

If the TRP receive beam information was not received, the UE performs a check to determine if TRP receive beam information was received in a previous reception within a persistence window (block 863). The persistence window may be time based, resource based, specific start or stop instruction based, and so on. The persistence window may be a value specified by a technical standard, an operator of the communications system. Alternatively, the persistence window is delineated by one or more persistence indicators. If the TRP receive beam information was received within the persistence window, the UE uses beam information application rules to determine transmit beams (block 865). The UE optionally uses information conveyed in a continuation indicator (if received) to adjust the transmit beams (block 867). As an illustrative example, if the continuation indicator conveys that the TRP is using the same receive beams, the UE does not need to make adjustments to the transmit beams. As another illustrative example, if the continuation indicator conveys that the TRP is using receive beams corresponding to an incremented downlink reference signal resource, the UE adjusts its transmit beams to the transmit beams corresponding to TRP receive beams associated with the incremented downlink reference signal resource. As another illustrative example, if the continuation indicator conveys that the TRP is using receive beams corresponding to a decremented downlink reference signal resource, the UE adjusts its transmit beams to the transmit beams corresponding to TRP receive beams associated with the decremented downlink reference signal resource. As yet another illustrative example, if the continuation indicator conveys that the TRP is using all receive beams, the UE adjusts its transmit beams to the transmit beams corresponding to all of the TRP receive beams, or the transmit beams that are significant with respect to the TRP receive beams. The UE transmits the SRS in accordance with the SRS configuration using the transmit beams (block 861).

If the TRP receive beam information was not received within the persistence window, the UE determines the transmit beams based on an assumption that all receive beams of a TRP are used to listen to the SRS resources (block 869) and signals the SRS in accordance with the SRS configuration using the transmit beams (block 861).

It is noted that the operations illustrated in FIG. 8B are based on example beam information application rules presented herein and that other example beam information application rules would result in different operations or different sequence of operations. Therefore, the operations illustrated in FIG. 8B should not be construed as being limiting to either the scope or the spirit of the example embodiments.

Figure 9:
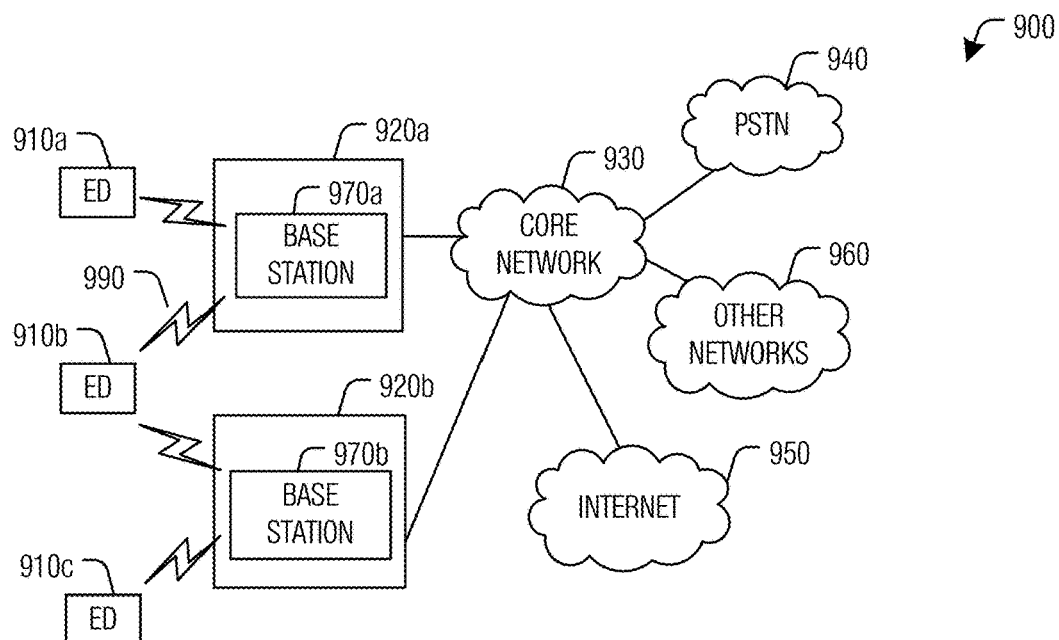
FIG. 9 illustrates an example communication system according to example embodiments described herein.

FIG. 9 illustrates an example communication system 900. In general, the system 900 enables multiple wireless or wired users to transmit and receive data and other content. The system 900 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 900 includes electronic devices (ED) 910a-910c, radio access networks (RANs) 920a-920b, a core network 930, a public switched telephone network (PSTN) 940, the Internet 950, and other networks 960. While certain numbers of these components or elements are shown in FIG. 9, any number of these components or elements may be included in the system 900.

The EDs 910a-910c are configured to operate or communicate in the system 900. For example, the EDs 910a-910c are configured to transmit or receive via wireless or wired communication channels. Each ED 910a-910c represents any suitable end user device and may include such devices (or may be referred to) as a user equipment/device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device.

The RANs 920a-920b here include base stations 970a-970b, respectively. Each base station 970a-970b is configured to wirelessly interface with one or more of the EDs 910a-910c to enable access to the core network 930, the PSTN 940, the Internet 950, or the other networks 960. For example, the base stations 970a-970b may include (or be) one or more of several well-known devices, such as a base transceiver station (BTS), a Node-B (NodeB), an evolved NodeB (eNodeB), next Generation NodeB (gNB), a Home NodeB, a Home eNodeB, a site controller, an access point (AP), or a wireless router. The EDs 910a-910c are configured to interface and communicate with the Internet 950 and may access the core network 930, the PSTN 940, or the other networks 960.

In the embodiment shown in FIG. 9, the base station 970a forms part of the RAN 920a, which may include other base stations, elements, or devices. Also, the base station 970b forms part of the RAN 920b, which may include other base stations, elements, or devices. Each base station 970a-970b operates to transmit or receive wireless signals within a particular geographic region or area, sometimes referred to as a "cell." In some embodiments, multiple-input multiple-output (MIMO) technology may be employed having multiple transceivers for each cell.

The base stations 970a-970b communicate with one or more of the EDs 910a-910c over one or more air interfaces 990 using wireless communication links. The air interfaces 990 may utilize any suitable radio access technology.

It is contemplated that the system 900 may use multiple channel access functionality, including such schemes as described above. In particular embodiments, the base stations and EDs implement LTE, LTE-A, LTE-B, LTE-C, or 5G NR. Of course, other multiple access schemes and wireless protocols may be utilized.

The RANs 920a-920b are in communication with the core network 930 to provide the EDs 910a-910c with voice, data, application, Voice over Internet Protocol (VoIP), or other services. Understandably, the RANs 920a-920b or the core network 930 may be in direct or indirect communication with one or more other RANs (not shown). The core network 930 may also serve as a gateway access for other networks (such as the PSTN 940, the Internet 950, and the other networks 960). In addition, some or all of the EDs 910a-910c may include functionality for communicating with different wireless networks over different wireless links using different wireless technologies or protocols. Instead of wireless communication (or in addition thereto), the EDs may communicate via wired communication channels to a service provider or switch (not shown), and to the Internet 950.

Although FIG. 9 illustrates one example of a communication system, various changes may be made to FIG. 9. For example, the communication system 900 could include any number of EDs, base stations, networks, or other components in any suitable configuration.

Figure 10A:
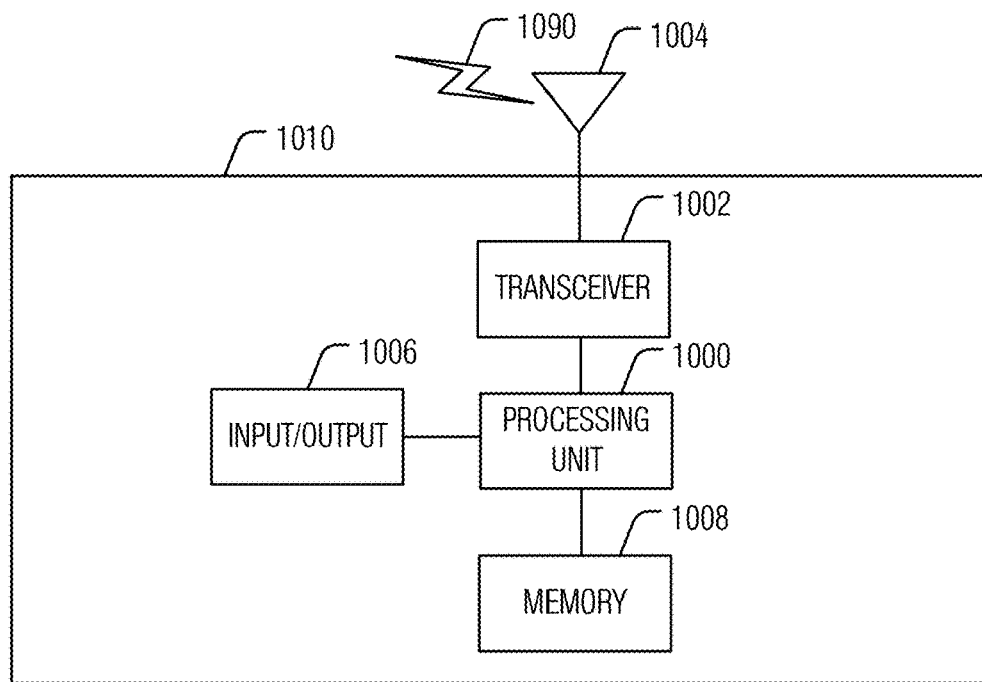
FIGS. 10A and 10B illustrate example devices that may implement the methods and teachings according to this disclosure.
Figure 10B:
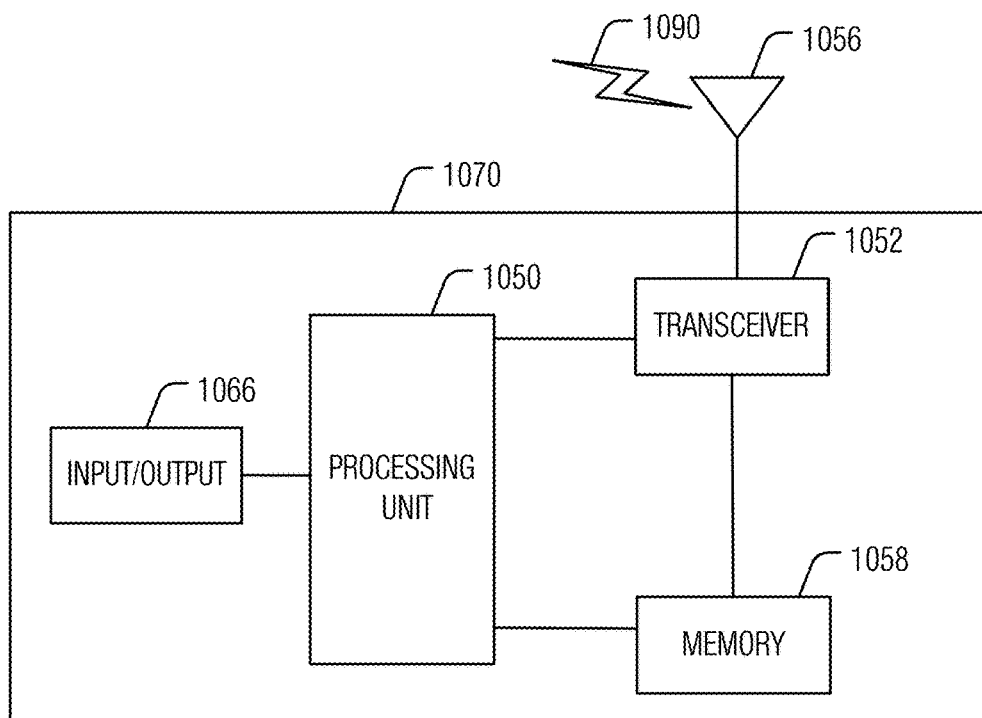

FIGS. 10A and 10B illustrate example devices that may implement the methods and teachings according to this disclosure. In particular, FIG. 10A illustrates an example ED 1010, and FIG. 10B illustrates an example base station 1070. These components could be used in the system 900 or in any other suitable system.

As shown in FIG. 10A, the ED 1010 includes at least one processing unit 1000. The processing unit 1000 implements various processing operations of the ED 1010. For example, the processing unit 1000 could perform signal coding, data processing, power control, input/output processing, or any other functionality enabling the ED 1010 to operate in the system 900. The processing unit 1000 also supports the methods and teachings described in more detail above. Each processing unit 1000 includes any suitable processing or computing device configured to perform one or more operations. Each processing unit 1000 could, for example, include a microprocessor, microcontroller, digital signal processor, field programmable gate array, or application specific integrated circuit.

The ED 1010 also includes at least one transceiver 1002. The transceiver 1002 is configured to modulate data or other content for transmission by at least one antenna or NIC (Network Interface Controller) 1004. The transceiver 1002 is also configured to demodulate data or other content received by the at least one antenna 1004. Each transceiver 1002 includes any suitable structure for generating signals for wireless or wired transmission or processing signals received wirelessly or by wire. Each antenna 1004 includes any suitable structure for transmitting or receiving wireless or wired signals. One or multiple transceivers 1002 could be used in the ED 1010, and one or multiple antennas 1004 could be used in the ED 1010. Although shown as a single functional unit, a transceiver 1002 could also be implemented using at least one transmitter and at least one separate receiver.

The ED 1010 further includes one or more input/output devices 1006 or interfaces (such as a wired interface to the Internet 950). The input/output devices 1006 facilitate interaction with a user or other devices (network communications) in the network. Each input/output device 1006 includes any suitable structure for providing information to or receiving/providing information from a user, such as a speaker, microphone, keypad, keyboard, display, or touch screen, including network interface communications.

In addition, the ED 1010 includes at least one memory 1008. The memory 1008 stores instructions and data used, generated, or collected by the ED 1010. For example, the memory 1008 could store software or firmware instructions executed by the processing unit(s) 1000 and data used to reduce or eliminate interference in incoming signals. Each memory 1008 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 10B, the base station 1070 includes at least one processing unit 1050, at least one transceiver 1052, which includes functionality for a transmitter and a receiver, one or more antennas 1056, at least one memory 1058, and one or more input/output devices or interfaces 1066. A scheduler, which would be understood by one skilled in the art, is coupled to the processing unit 1050. The scheduler could be included within or operated separately from the base station 1070. The processing unit 1050 implements various processing operations of the base station 1070, such as signal coding, data processing, power control, input/output processing, or any other functionality. The processing unit 1050 can also support the methods and teachings described in more detail above. Each processing unit 1050 includes any suitable processing or computing device configured to perform one or more operations. Each processing unit 1050 could, for example, include a microprocessor, microcontroller, digital signal processor, field programmable gate array, or application specific integrated circuit.

Each transceiver 1052 includes any suitable structure for generating signals for wireless or wired transmission to one or more EDs or other devices. Each transceiver 1052 further includes any suitable structure for processing signals received wirelessly or by wire from one or more EDs or other devices. Although shown combined as a transceiver 1052, a transmitter and a receiver could be separate components. Each antenna 1056 includes any suitable structure for transmitting or receiving wireless or wired signals. While a common antenna 1056 is shown here as being coupled to the transceiver 1052, one or more antennas 1056 could be coupled to the transceiver(s) 1052, allowing separate antennas 1056 to be coupled to the transmitter and the receiver if equipped as separate components. Each memory 1058 includes any suitable volatile or non-volatile storage and retrieval device(s). Each input/output device 1066 facilitates interaction with a user or other devices (network communications) in the network. Each input/output device 1066 includes any suitable structure for providing information to or receiving/providing information from a user, including network interface communications.

Figure 11:
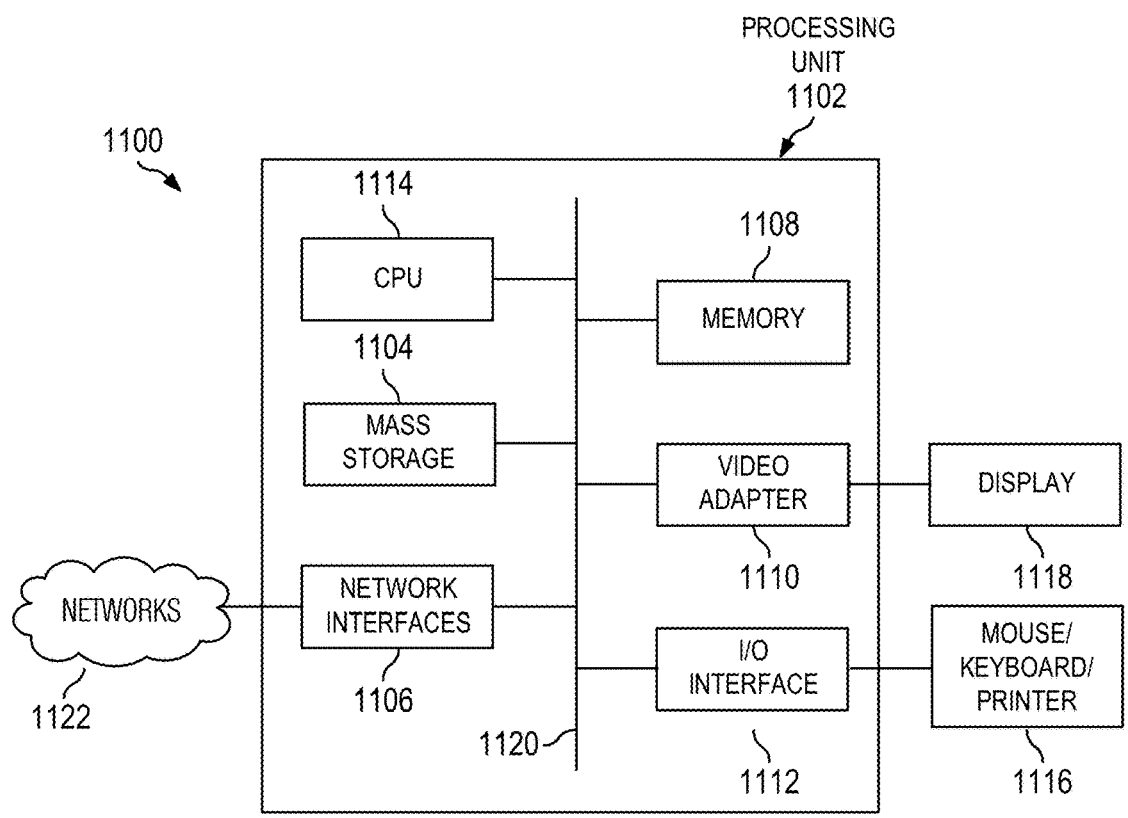
FIG. 11 is a block diagram of a computing system that may be used for implementing the devices and methods disclosed herein.

FIG. 11 is a block diagram of a computing system 1100 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1100 includes a processing unit 1102. The processing unit includes a central processing unit (CPU) 1114, memory 1108, and may further include a mass storage device 1104, a video adapter 1110, and an I/O interface 1112 connected to a bus 1120.

The bus 1120 may be one or more of any type of several bus architectures including a memory bus or memory controller, a peripheral bus, or a video bus. The CPU 1114 may comprise any type of electronic data processor. The memory 1108 may comprise any type of non-transitory system memory such as static random access memory (SRAM), dynamic random access memory (DRAM), synchronous DRAM (SDRAM), read-only memory (ROM), or a combination thereof. In an embodiment, the memory 1108 may include ROM for use at boot-up, and DRAM for program and data storage for use while executing programs.

The mass storage 1104 may comprise any type of non-transitory storage device configured to store data, programs, and other information and to make the data, programs, and other information accessible via the bus 1120. The mass storage 1104 may comprise, for example, one or more of a solid state drive, hard disk drive, a magnetic disk drive, or an optical disk drive.

The video adapter 1110 and the I/O interface 1112 provide interfaces to couple external input and output devices to the processing unit 1102. As illustrated, examples of input and output devices include a display 1118 coupled to the video adapter 1110 and a mouse, keyboard, or printer 1116 coupled to the I/O interface 1112. Other devices may be coupled to the processing unit 1102, and additional or fewer interface cards may be utilized. For example, a serial interface such as Universal Serial Bus (USB) (not shown) may be used to provide an interface for an external device.

The processing unit 1102 also includes one or more network interfaces 1106, which may comprise wired links, such as an Ethernet cable, or wireless links to access nodes or different networks. The network interfaces 1106 allow the processing unit 1102 to communicate with remote units via the networks. For example, the network interfaces 1106 may provide wireless communication via one or more transmitters/transmit antennas and one or more receivers/receive antennas. In an embodiment, the processing unit 1102 is coupled to a local-area network 1122 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a determining unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A computer implemented method for operating a user equipment (UE), the method comprising:
   receiving, by the UE from a transmit-receive point (TRP), a sounding reference signal (SRS) configuration for a SRS resource, the SRS configuration indicating a specific TRP beam listened to for reception of a SRS by the TRP;
   determining, by the UE, a specific UE beam for transmitting a SRS by the UE based on the specific TRP beam listened to for reception of a SRS by the TRP; and
   transmitting, by the UE, the SRS on the SRS resource using the specific UE beam determined by the UE.

2. The method of claim 1, wherein the specific UE beam is further determined in accordance with downlink channel measurements made by the UE.

3. The method of claim 1, further comprising:
   determining, by the UE, the specific UE beam further in accordance with previously-received TRP receive beam information.

4. The method of claim 1, further comprising:
   determining, by the UE, the specific UE beam further in accordance with a continuation indicator and previously-received TRP receive beam information.

5. The method of claim 1, further comprising:
   determining, by the UE, the specific UE beam further in accordance with a persistence indicator and previously-received TRP receive beam information.

6. The method of claim 1, wherein the SRS configuration includes at least two message types for each SRS resource.

7. The method of claim 6, wherein a first message type conveys information about a receive beam at the TRP associated with a SRS resource.

8. The method of claim 7, wherein a second message type conveys information about whether the receive beam has changed with respect to the first message type.

9. The method of claim 7, wherein a second message type conveys information about a persistence window for the receive beam.

10. The method of claim 1, wherein the SRS configuration includes an uplink reference signal resource indicator previously transmitted by the UE and received using a receive beam associated with the SRS resource as specified in the SRS configuration.

11. The method of claim 1, wherein the SRS configuration includes a downlink reference signal resource indicator previously transmitted by the UE and received with spatial filtering associated with a receive beam associated with the SRS resource as specified in the SRS configuration.

12. The method of claim 1, wherein the SRS configuration includes an uplink data signal resource indicator previously transmitted by the UE and received using a receive beam associated with the SRS resource as specified in the SRS configuration.

13. A user equipment (UE) comprising:
a non-transitory memory storage comprising instructions; and
one or more processors in communication with the memory storage, wherein the one or more processors execute the instructions to:
receive, from a transmit-receive point (TRP), a sounding reference signal (SRS) configuration for a SRS resource, the SRS configuration indicating a specific TRP beam listened to for reception of a SRS by the TRP;
determine a specific UE beam for transmitting a SRS, wherein the specific UE beam is based on the specific TRP beam listened to for reception of a SRS by the TRP; and
transmit the SRS on the SRS resource using the specific UE beam determined by the UE.

14. The UE of claim 13, wherein the one or more processors further execute the instructions to determine the specific UE beam in accordance with downlink channel measurements made by the UE.

15. The UE of claim 13, wherein the one or more processors further execute the instructions to determine the specific UE beam further in accordance with previously-received TRP receive beam information.

16. The UE of claim 13, wherein the one or more processors further execute the instructions to determine the specific UE beam further in accordance with a continuation indicator and previously-received TRP receive beam information.

17. The UE of claim 13, wherein the one or more processors further execute the instructions to determine the specific UE beam further in accordance with a persistence indicator and previously-received TRP receive beam information.

18. The UE of claim 13, wherein the SRS configuration includes an uplink reference signal resource indicator previously transmitted by the UE and received using a receive beam associated with the SRS resource as specified in the SRS configuration.

19. The UE of claim 13, wherein the SRS configuration includes a downlink reference signal resource indicator previously transmitted by the UE and received with spatial filtering associated with a receive beam associated with the SRS resource as specified in the SRS configuration.

20. The UE of claim 13, wherein the SRS configuration includes an uplink data signal resource indicator previously transmitted by the UE and received using a receive beam associated with the SRS resource as specified in the SRS configuration.

21. The UE of claim 13, wherein the SRS configuration includes at least two message types for each SRS resource.

22. A non-transitory computer-readable medium storing computer instructions, that when executed by one or more processors, cause the one or more processors to perform steps to:
receive, from a transmit-receive point (TRP), a sounding reference signal (SRS) configuration for a SRS resource, the SRS configuration indicating a specific TRP beam listened to for reception of a SRS by the TRP;
determine a specific UE beam for transmitting a SRS, wherein the specific UE beam is based on the specific TRP beam listened to for reception of a SRS by the TRP; and
transmit the SRS on the SRS resource using the specific UE beam determined by the UE.

23. The non-transitory computer-readable medium of claim 22, wherein the one or more processors further execute the instructions to determine the specific UE beam in accordance with downlink channel measurements made by a user equipment (UE).

24. The non-transitory computer-readable medium of claim 22, wherein the one or more processors further execute the instructions to determine the specific UE beam further in accordance with previously-received TRP receive beam information.

25. The non-transitory computer-readable medium of claim 22, wherein the one or more processors further execute the instructions to determine the specific UE beam further in accordance with a continuation indicator and previously-received TRP receive beam information.

26. The non-transitory computer-readable medium of claim 22, wherein the one or more processors further execute the instructions to determine the specific UE beam further in accordance with a persistence indicator and previously-received TRP receive beam information.

27. The non-transitory computer-readable medium of claim 22, wherein the SRS configuration includes at least two message types for each SRS resource.

* * * * *